F211D XR RE 4,998

BEST AVAILABLE COPY

UNITED STATES PATENT OFFICE.

ROBERT J. EVERETT, OF BRIDGEPORT, CONNECTICUT, ASSIGNOR TO WILLIAM H. ADAMS, OF SAME PLACE.

IMPROVEMENT IN PURIFYING ILLUMINATING-GAS AND UTILIZING THE WASTES THEREFROM.

Specification forming part of Letters Patent No. 125,943, dated April 23, 1872; reissue No. 4,998, dated July 23, 1872.

*To all whom it may concern:*

Be it known that I, ROBERT J. EVERETT, of London, England, temporarily residing in Bridgeport, in the county of Fairfield and State of Connecticut, have invented a new Improvement in Process of Purifying Illuminating-Gas and Utilizing the Wastes therefrom; and I do hereby declare the following to be a full, clear, and exact description of the same.

In the ordinary methods of purifying gas after passing the condenser excessive amounts of water are used in what is termed the "scrubber," by which process certain portions of the ammonia and sulphureted hydrogen contained in the crude gas are separated, and in most cases are washed away, thus occasioning great loss of valuable materials, at the same time being exceedingly detrimental to the health of large cities.

The object of this invention is to turn to profitable account the several chemical substances which are now wasted generally, to the detriment of the localities where gas-works are situated, by being allowed to pass into the sewers or waters surrounding such places. My invention consists in the process of extracting and utilizing the above-mentioned impurities contained in crude gas after they have been separated therefrom by the action of the material I employ for that purpose, and restoring such purifying material after it has become charged to its full extent with such impurities, all as more fully hereinafter described. Before proceeding to describe my process of restoring and utilizing, I will first describe the purifying process by which the material to be restored is produced.

The manner in which the material (hereinafter more fully described) is made use of in the purifying of gas is as follows: In the ordinary purifiers, consisting of iron boxes of any shape, with trays or screens on which the purifying material is placed, and through which the gas is passed, I place my material to the depth of five or six inches, or more, in the same manner as lime or oxide of iron are at present used. The impure gas from the condensers is then passed into the bottom of such ordinary purifiers, and passing upward by pressure all the ammonia and a large proportion of the sulphureted hydrogen are retained by virtue of the chemical decomposition of the material employed. The gas, now entirely freed from its ammonia and from part of its sulphureted hydrogen, is passed through other purifiers as ordinarily employed for the extraction of the remaining amount of sulphureted hydrogen and carbonic-acid gas, and thence passed into the gasometers perfectly freed from deleterious substances.

I will now proceed to describe the material used upon the trays or screens, before referred to. I use green copperas (sulphate of iron) either crystallized or anhydrous, with or without the admixture of sawdust, or other kindred material, to render the sulphate of iron light and porous, to allow the free passage of gas through the substance in the purifiers. Instead of the above, I may use the residuum from the manufacture of sulphur from what is commercially termed "spent oxide of iron"—that is to say, oxide of iron, iron-ore, bog-ore, or any other suitable compound of iron, which has been used for the purification of gas from sulphureted hydrogen, until it is so fully charged with sulphur as to be of no further use for purifying purposes. Sulphate of manganese may also be employed in similar manner as described for sulphate of iron; as also the residuum from oxide of manganese when charged with sulphur, and treated in a similar manner as described for "spent oxide of iron." This material, when placed in purifiers, as previously described, and coming in contact with gas containing ammonia and sulphureted hydrogen, causes a chemical action to take place, such ammonia being retained by the sulphuric acid of the material, thereby forming sulphate of ammonia with the precipitation of the iron of the material, which iron decomposes the sulphureted hydrogen by combining with the sulphur therein contained. This action is constant until thorough saturation of the material is accomplished, when it is removed to be replaced by fresh material. This saturated material will then contain about thirty-three per cent. of sulphate of ammonia.

I will now proceed to describe my process of extracting such ammonia and restoring the above-described purifying material. In order to extract such amount of ammonia and prepare the material for reabsorbing a further quantity, I proceed as follows: The material when removed from the purifier is submitted to the action of heat in vessels or retorts without access of air, whereby the salts of ammonia and a portion of sulphur therein contained are volatilized and collected in a chamber attached to the apparatus, or by any convenient method, while the residuum left in the retorts or vessels, which consists of sulphuret of iron, is proceeded with by being quenched with water to prevent the oxidization of the sulphur therein contained, and exposed to the action of the air in heaps, where, by the absorption of oxygen by both the iron and sulphur it contains, it reforms into sulphate of iron, as originally commenced with, which can then be employed for further purifying operations, as previously described. If preferred, the saturated material can be subjected to the action of water, whereby the sulphate of ammonia therein contained can be extracted in solution, and the salt produced by crystallization or evaporation of the said solution, and the remaining mixtures of iron, sulphur, and other substances are then subjected to heat without access of air in vessels or retorts, and proceeded with as before stated for the reformation of sulphate of iron for subsequent operations.

This invention was patented in England, dated April 14, 1870, No. 1,099.

I claim as my invention—

The process herein described for restoring and utilizing the said material after it has become charged, as and for the purpose specified.

ROBERT J. EVERETT.

Witnesses:

C. H. HEWETT,

HENRY C. BEACH.